United States Patent
Yoshida (10) Patent No.: US 10,293,558 B2
(45) Date of Patent: May 21, 2019

(54) COMPOSITE MATERIAL MOLDED ARTICLE AND METHOD OF PRODUCING SAME

(71) Applicant: Nissan Motor Co., Ltd., Kanagawa (JP)

(72) Inventor: Takeshi Yoshida, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 193 days.

(21) Appl. No.: 15/313,305

(22) PCT Filed: May 26, 2014

(86) PCT No.: PCT/JP2014/063833
§ 371 (c)(1),
(2) Date: Nov. 22, 2016

(87) PCT Pub. No.: WO2015/181870
PCT Pub. Date: Dec. 3, 2015

(65) Prior Publication Data
US 2017/0136717 A1 May 18, 2017

(51) Int. Cl.
*B29L 9/00* (2006.01)
*B32B 5/20* (2006.01)
(Continued)

(52) U.S. Cl.
CPC ............ *B29C 70/345* (2013.01); *B29C 44/10* (2013.01); *B29C 44/1276* (2013.01);
(Continued)

(58) Field of Classification Search
CPC ....... B29C 70/345; B29C 70/48; B29C 44/10; B29C 44/12; B29C 44/38; B29C 44/385;
(Continued)

(56) References Cited

U.S. PATENT DOCUMENTS 4,028,477 A 6/1977 Goppel et al.
5,173,227 A * 12/1992 Ewen .................. B29C 44/1209
264/257
(Continued)

FOREIGN PATENT DOCUMENTS

CN 1684808 A 10/2005
CN 103079810 A 5/2013
(Continued)

OTHER PUBLICATIONS

Liang Mingchang et al.; "Injection Molding Practical Technology", Liaoning Science and Technology Press, Shenyang; Jan. 2010 (64 pages).
(Continued)

*Primary Examiner* — Carson Gross
(74) *Attorney, Agent, or Firm* — Osha Liang LLP (57) ABSTRACT

A method of producing a composite material molded article includes enclosing a core fiber base material formed from unwoven fabric in a molding tool with the core fiber base material placed between a first reinforcing fiber base material and a second reinforcing fiber base material, injecting matrix resin into the first and second reinforcing fiber base materials in the molding tool, and injecting foamable resin into the core fiber base material in the molding tool.

1 Claim, 9 Drawing Sheets

(51) Int. Cl.
| | |
|---|---|
| *B32B 5/24* | (2006.01) |
| *B29C 44/10* | (2006.01) |
| *B29C 44/12* | (2006.01) |
| *B29C 44/34* | (2006.01) |
| *B29C 44/38* | (2006.01) |
| *B29C 44/44* | (2006.01) |
| *B29C 70/34* | (2006.01) |
| *B29C 70/48* | (2006.01) |
| *B32B 17/06* | (2006.01) |
| *B32B 19/04* | (2006.01) |
| *B32B 23/04* | (2006.01) |
| *B32B 38/00* | (2006.01) |
| *B29K 105/04* | (2006.01) |
| *B29K 105/08* | (2006.01) |

(52) U.S. Cl.
CPC ........ *B29C 44/3426* (2013.01); *B29C 44/445* (2013.01); *B29C 44/385* (2013.01); *B29C 70/48* (2013.01); *B29K 2105/048* (2013.01); *B29K 2105/0809* (2013.01); *B29L 2009/00* (2013.01); *B32B 5/20* (2013.01); *B32B 5/245* (2013.01); *B32B 17/066* (2013.01); *B32B 19/047* (2013.01); *B32B 23/048* (2013.01); *B32B 2038/0084* (2013.01); *B32B 2250/03* (2013.01); *B32B 2250/40* (2013.01); *B32B 2305/022* (2013.01)

(58) Field of Classification Search
CPC ....... B29C 44/386; B29C 44/365; B32B 5/20; B32B 5/245; B32B 17/066; B32B 19/047; B32B 23/048; B32B 2250/03; B32B 2250/40; B32B 2305/022; B32B 2038/0084
See application file for complete search history.

(56) References Cited

U.S. PATENT DOCUMENTS

| | | | | |
|---|---|---|---|---|
| 5,800,749 | A | * | 9/1998 | Lewit ................. B29C 44/1209 264/258 |
| 6,048,488 | A | * | 4/2000 | Fink ....................... B29C 70/08 264/102 |
| 9,132,607 | B2 | | 9/2015 | Kasuga et al. |
| 2006/0099401 | A1 | | 5/2006 | Lamers et al. |
| 2013/0001817 | A1 | | 1/2013 | Bessho et al. |
| 2013/0127092 | A1 | | 5/2013 | Dauner et al. |
| 2013/0189509 | A1 | | 7/2013 | Kasuga et al. |

FOREIGN PATENT DOCUMENTS

| | | | |
|---|---|---|---|
| DE | 102010033627 | A1 | 2/2012 |
| JP | S57-24245 | A | 2/1982 |
| JP | S63-54221 | A | 3/1988 |
| JP | 04329122 | A * | 11/1992 |
| JP | H04-329122 | A | 11/1992 |
| JP | H10-128792 | A | 5/1998 |
| JP | 2006-500253 | A | 1/2006 |
| JP | 2009-012359 | A | 1/2009 |
| JP | 2009-051209 | A | 3/2009 |
| JP | 4615398 | B2 | 10/2010 |
| JP | 2011-051104 | A | 3/2011 |
| WO | 2011/118226 | A1 | 9/2011 |

OTHER PUBLICATIONS

International Preliminary Report on Patentability issued in corresponding Application No. PCT/JP2014/063833, dated Dec. 8, 2016 (15 pages).

* cited by examiner

COMPOSITE MATERIAL MOLDED ARTICLE AND METHOD OF PRODUCING SAME

BACKGROUND

Technical Field

The present invention relates to a composite material molded article and a method of producing the same.

Related Art

Japanese Patent No. 4615398 discloses a carbon fiber composite material molded article in which a core layer formed from unwoven fabric is held between two outer layers.

SUMMARY OF INVENTION

A composite material molded article including unwoven fabric employed for a core layer or an intermediate layer thereof can have a larger amount of deformation when a pressing force is applied to the surface of the product, because the unwoven fabric in the core layer can be easily crushed and deformed. Meanwhile, impregnating all the unwoven fabric in the core layer with a matrix resin in order to reduce the amount of deformation inevitably increases the amount of matrix resin, thereby resulting in an increase in the mass of the product.

One or more embodiments of the present invention reduces the amount of deformation of a composite material molded article caused by a pressing force and to suppress mass increase of the composite material molded article, the composite material molded article having an intermediate layer including unwoven fabric.

A composite material molded article according to one or more embodiments of the present invention includes an intermediate layer formed from a composite molded body that is a composite of unwoven fabric and foamed resin.

The composite material molded article includes an intermediate layer formed from the composite molded body that is the composite of the unwoven fabric and the foamed resin, or the molded body of the foamed resin reinforced with fibers of the unwoven fabric. For this reason, the intermediate layer is less easily crushed or deformed when a pressing force is applied to the surface of the product, as compared with an intermediate layer formed from unwoven fabric. Thus, the composite material molded article can reduce the amount of deformation caused therein by the pressing force. In addition, the composite molded body constituting the intermediate layer includes the foamed resin as a matrix, which includes multiple cells therein. Thus, the composite material molded article can have a reduced amount of matrix resin in the intermediate layer, whereby a mass increase thereof can be suppressed.

BRIEF DESCRIPTION OF DRAWINGS

FIGS. 6(a)-6(d) are diagrams explaining another method of producing the composite material molded article shown in FIG. 1.

DETAILED DESCRIPTION

Referring to the drawings, descriptions will be provided hereinbelow for some embodiments of the present invention. Incidentally, dimensional ratios on the drawings may be exaggerated for the sake of explanatory convenience, and may be different from actual dimensional ratios. In addition, expressions indicating directions such as "upper" and "lower" in the following descriptions are provided for the sake of convenience in explaining positional relationships among members, and do not limit the actual installation orientations and so on of the members. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

<Composite Material Molded Article>

Figure 1:
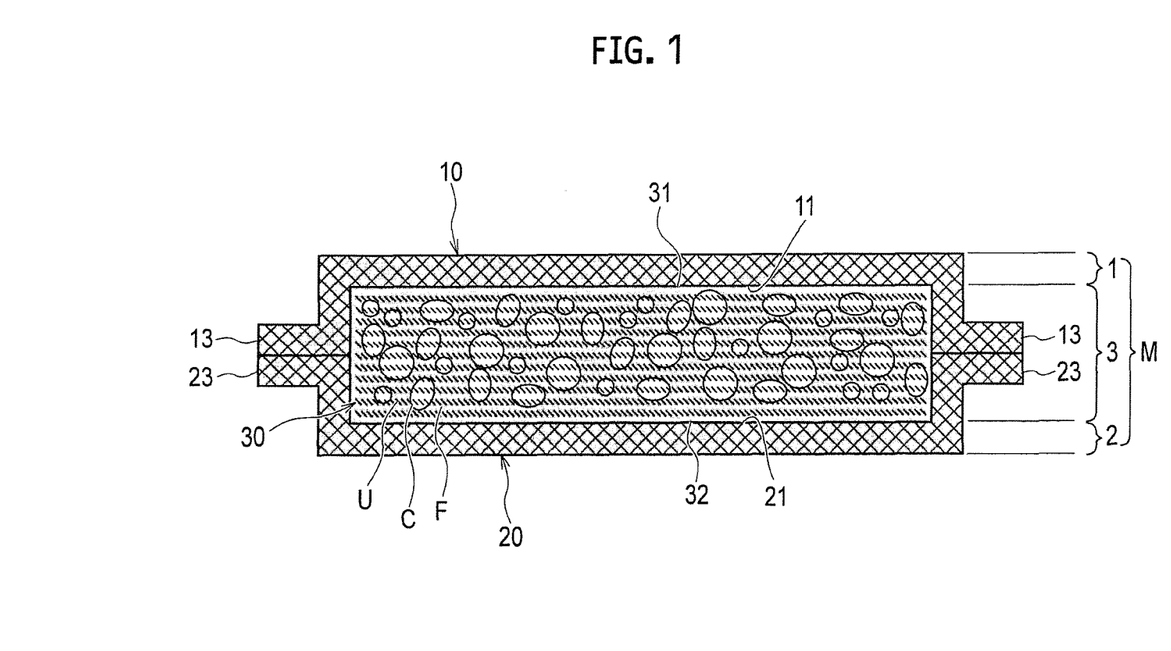
FIG. 1 is a cross-sectional diagram of a composite material molded article of one or more embodiments of the present invention.

Referring to FIG. 1, descriptions will be provided for a composite material molded article (hereinafter referred to as a molded article M) of one or more embodiments of the present invention.

As shown in FIG. 1, the molded article M includes a first surface layer 1, a second surface layer 2, and an intermediate layer 3 disposed in between.

The first surface layer 1 is formed from a sheet-shaped first outer layer member 10, which is formed from a fiber-reinforced plastic. The second surface layer 2 is formed from a sheet-shaped second outer layer member 20 which is formed from a fiber-reinforced plastic. No specific restriction is imposed on the thicknesses of the respective surface layers 1 and 2, or the thicknesses of the respective outer layer members 10 and 20. Their thicknesses may be set as appropriate depending on strength, rigidity, and the like required for the molded article M. In a case where the molded article M is used as a vehicle part for an automobile or the like, the thickness of the outer layer members 10 and 20 is each set at approximately 0.4 to 3.0 mm, for example. Incidentally, the outer layer members 10 and 20 may be formed from the same fiber-reinforced plastic, or of mutually-different fiber-reinforced plastics, depending on the required strength, rigidity, molding formability, etc.

No specific restriction is imposed on materials of the fiber-reinforced plastic. Examples of reinforcing fibers include carbon fibers, glass fibers, polyaramid fibers, alumina fibers, silicon carbide fibers, boron fibers, and silicon carbide fibers. Examples of usable carbon fibers include polyacrylonitrile (PAN)-based carbon fibers, pitch-based carbon fibers, cellulose-based carbon fibers, vapor grown carbon fibers grown from hydrocarbon, and graphite fibers. Two or more types of the fibers may be used in combination. Meanwhile, publicly-known thermosetting resin and thermoplastic resin can be used as the resin for the matrix. Typical examples of the matrix resin include epoxy resins, phenol resins, unsaturated polyester resins, vinyl ester resins, polycarbonate resins, polyester resins, polyamide (PA) resins, liquid crystal polymer resins, polyether sulfone resins, polyether etherketone resins, polyarylate resins, polyphenylene ether resins, polyphenylene sulfide (PPS) resins, polyacetal resins, polysulfone resins, polyimide resins, polyetherimide resins, polyetherimide resins, polyolefin resins, polystyrene resins, modified polystyrene resins, AS resins (acrylonitrile-styrene copolymers), ABS resins (acrylonitrile-butadiene-styrene copolymers), modified ABS resins, MBS resins (methyl methacrylate-butadiene-styrene copolymers), modified MBS resins, polymethyl methacrylate (PMMA) resins, and modified polymethyl methacrylate resins.

The intermediate layer 3 is formed from a sheet-shaped core member 30. The core member 30 is a molded article of a foamed resin F using unwoven fabric U as a fiber base material (a composite molded body of a composite of the unwoven fabric U and the foamed resin F). No specific restriction is imposed on the thickness of the intermediate layer 3, or the thickness of the core member 30. The thickness may be set as appropriate, depending on the strength, rigidity and the like required for the molded article M. In a case where the molded article M is used as a vehicle part for an automobile or the like, the thickness of the core member 30 is set at approximately 1.0 to 20.0 mm, for example.

The molded article M has a so-called sandwich structure in which the outer layer members 10 and 20 are disposed on the two surfaces of the core member 30, respectively. An upper surface 31 of the core member 30 is surface joined to a lower surface (back surface) 11 of the outer layer member 10, while a lower surface 32 of the core member 30 is surface-joined to an upper surface (back surface) 21 of the outer layer member 20. In addition, end portions 13 and 23 of the outer layer members 10 and 20 are joined together in each of the two end edge portions of the molded article M. This increases bending rigidity of the molded article M. Incidentally, the structure of each end edge portion of the molded article M is not limited to this example. The end portions 13 and 23 may be only partially joined together, and do not have to be fully joined together.

The core member 30 has a structure in which fibers of the unwoven fabric U are integrated into the porous resin including numerous cells C. The fibers of the unwoven fabric U reinforce the resin by being embedded in or fixed to the resin forming the cell walls, and thus function as reinforcing fibers for the core member 30. Parts of the fibers of the unwoven fabric U may enter the cells C. Otherwise, the core member 30 may include a structure in which a resin lump surrounded by the cell C is supported by the fibers of the unwoven fabric U. Meanwhile, no specific restriction is imposed on the structure of the cells C. The structure may include both or either of the closed cells partitioned from one another and interconnected cells linked to one another. Incidentally, a higher proportion of the closed cells in the core member 30 and a lower proportion of the interconnected cells therein make it possible to make the strength and hardness of the molded article M higher.

The density of the core member 30 is set lower than that of the fiber-reinforced plastic from which the outer layer members 10 and 20 are formed. In a case where, for example, a carbon fiber-reinforced plastic (with a specific gravity of approximately 1.55), including epoxy resin as the matrix resin, is employed as the material of the outer layer members 10 and 20, the density of the core member 30 is set such as, for example, the specific gravity is not less than 0.1 but not greater than 1.5. Depending on the necessity, the density of the core member 30 may be set at a desired value by adjusting things such as material, porosity (or expansion ratio), the content of the fiber base material (unwoven fabric U) per unit volume of the foamed resin F. Specific examples of the material of the foamed resin F include polyurethane (PU), polystyrene (PS), polyethylene (PE), polypropylene (PP), ethylene propylene diene monomer rubber (EPDM), acryl, polyimide (PI), polyvinyl chloride (PVC), phenol (PF), silicone (SI), polyethylene terephthalate (PET), and ethylene vinyl acetate copolymer (EVA). Furthermore, the strength, rigidity, and the like of the core member 30 can be set at desired values by adjusting: the density of the core member 30, the thickness of the core member 30, as well as the fiber diameter, fiber length, and material of the fiber base material (unwoven fabric U).

The unwoven fabric U is a fiber sheet, web, or batt in which fibers are oriented in one direction, or randomly. The fibers of the unwoven fabric U are bonded together by interlacement, fusion, adhesion, or the like. No specific restriction is imposed on the material of the fibers of the unwoven fabric U. Specific examples of the material of the fibers of the unwoven fabric U include carbon fibers, glass fibers, cellulose fibers, nylon fibers, vinylon fibers, polyester fibers, polyolefin fibers, rayon fibers, aramid fibers, and felt. They may be used singularly or in combination of two or more.

The intermediate layer 3 of the molded article M is formed from the composite molded body which is the composite of the unwoven fabric U and the foamed resin F, or the molded article of the foamed resin F reinforced with the fibers of the unwoven fabric U. For this reason, the intermediate layer 3 is less easily crushed or deformed when a pressing force is applied to the surface of the product, as compared with an intermediate layer formed from unwoven fabric. Thus, the molded article M can reduce the amount of deformation caused therein by a pressing force. In addition, the composite molded body constituting the intermediate layer 3 includes the foamed resin F as a matrix which includes the multiple cells C therein. Thus, the molded article M can have a reduced amount of matrix resin in the intermediate layer 3, whereby mass increase thereof can be suppressed.

Referring to FIGS. 2(a) to 9(d), descriptions will be provided hereinbelow for the method of efficiently producing the molded article M.

<Method P1 of Producing Molded Article M>

Referring to FIGS. 2(a)-2(d), descriptions will be provided for a method P1 of producing the molded article M.

Figure 2A:
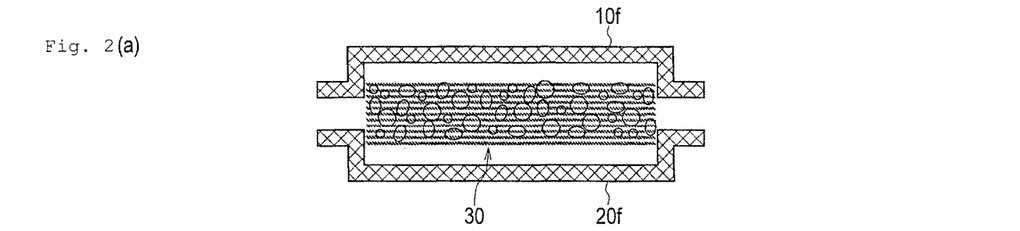
FIGS. 2(a)-2(d) are diagrams explaining a method of producing the composite material molded article shown in FIG. 1.
Figure 2B:
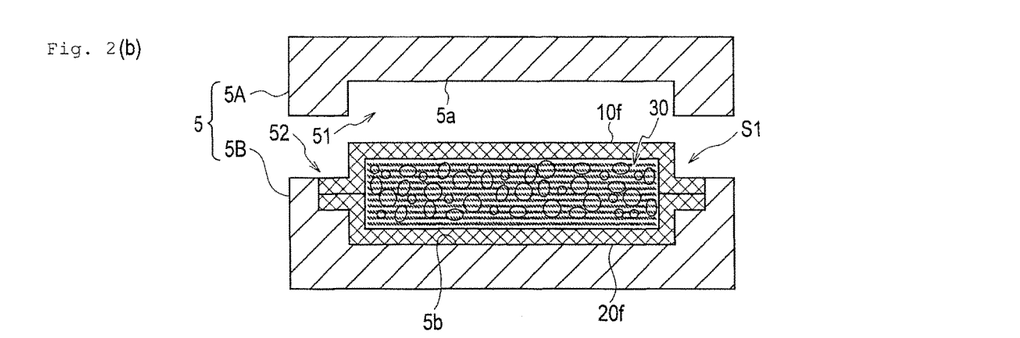
Figure 2C:
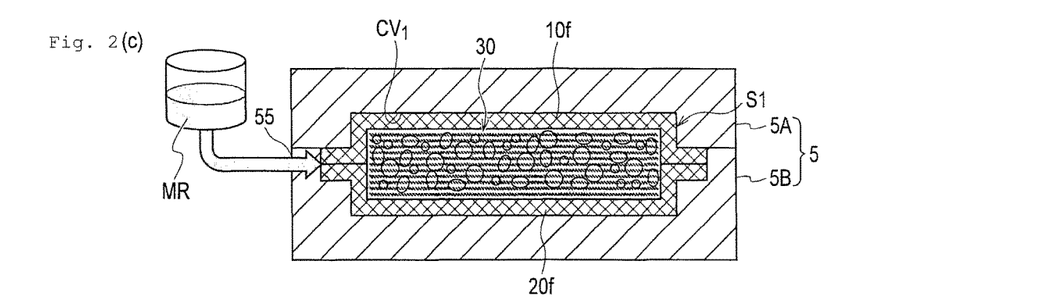

First, a first reinforcing fiber body 10f, which is a fiber base material of the first outer layer member 10, and a second reinforcing fiber body 20f, which is a fiber base material of the second outer layer member 20, are prepared from so-called dry-reinforcing fibers which are not impregnated with resin. The reinforcing fiber bodies 10f and 20f are formed from: reinforcing fiber strands stacked in the same or different orientations, and are bundled together with stitching threads; reinforcing fiber strands retained to one another by heat welding without using stitching threads; reinforcing fiber cloth; or the like. The reinforcing fibers constituting the reinforcing fiber bodies 10*f* and 20*f* may be continuous reinforcing fibers, or discontinuous fibers. Otherwise, the reinforcing fibers may include both continuous and discontinuous fibers.

Furthermore, the core member 30 is prepared using one of a method C1 of preparing the core member 30 or a method C2 of preparing the core member 30, which will be described later.

Subsequently, a first laminated body S1 is formed: by placing the reinforcing fiber body 10*f* on the core member 30; and placing the reinforcing fiber body 20*f* under the core member 30, as shown in FIG. 2(*a*).

Thereafter, the first laminated body S1 is set in a molding tool 5, as shown in FIG. 2(*b*). The molding tool 5 includes an upper mold 5A and a lower mold 5B. A recessed portion 51 having a molding surface 5*a* is formed in the upper mold 5A. A recessed portion 52 having a molding surface 5*b* is formed in the lower mold 5B. When the molding tool 5 is closed, the recessed portion 51 and the recessed portion 52 are positioned opposite to each other so that the molding surface 5*a* and the molding surface 5*b* form a closed mold cavity $CV_1$.

After that, as shown in FIG. 2(*c*), the first laminated body S1 is enclosed in the molding tool 5 by closing the molding tool 5, and the molten matrix resin MR is injected into the cavity $CV_1$ from a matrix resin injection inlet 55 provided to the molding tool 5. The thus-injected matrix resin MR spreads across spaces formed around the core member 30, between the outer peripheral surfaces of the core member 30 and the molding surfaces 5*a* and 5*b*. Thereby, the matrix resin MR reaches every part of the two reinforcing fiber bodies 10*f* and 20*f*, while entering interstices among the reinforcing fibers forming the reinforcing fiber bodies 10*f* and 20*f*. Incidentally, the fluid pressure, fluid temperature, injection rate, and so on for the injection can be determined according to recommended molding conditions for the matrix resin MR to be used, and can be adjusted as needed depending on the dimensions and the like of the outer layer members 10 and 20. For example, in a case where epoxy resin is employed, the fluid pressure can be set at 7 to 20 MPa, and the fluid temperature can be set at 40 to 80° C.

Figure 2D:
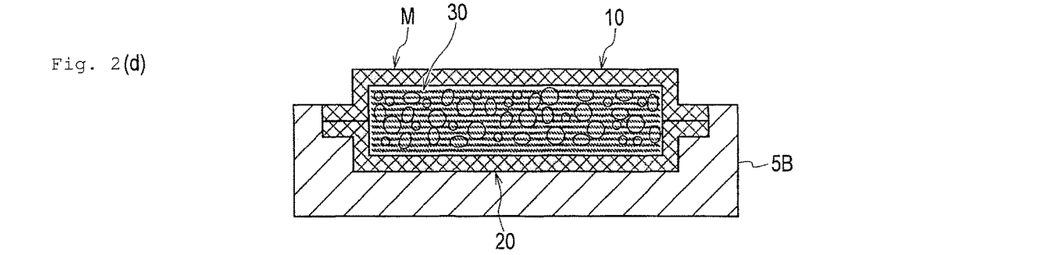

Subsequently, the upper mold 5A and the lower mold 5B press and heat the first laminated body 51 at a curing temperature (for example, 120 to 130° C.) of the matrix resin MR to cure the matrix resin MR, which is injected into the reinforcing fiber bodies 10*f* and 20*f*. After the matrix resin MR is cured, the reinforcing fiber bodies 10*f* and 20*f* become the outer layer members 10 and 20, which are integrally-molded with the core member 30. Thereafter, the molding tool 5 is opened as shown in FIG. 2(*d*), and the integrally-molded outer layer members 10 and 20 and core member 30 are taken out of the molding tool 5 to obtain the molded article M.

As described above, the production method P1 encloses the core member 30 in the molding tool 5 with the core member 30 placed between the reinforcing fiber bodies 10*f* and 20*f*, and thereafter injects the molten matrix resin MR into the reinforcing fiber bodies 10*f* and 20*f*. Thus, the production method P1 can accurately form the matrix resin MR into intended shapes using the molding surfaces 5*a* and 5*b* of the molding tool 5, and accordingly can efficiently produce the molded article M having complicated surface shapes.

In addition, the core member 30 is the composite molded body that is a composite of the unwoven fabric U and the foamed resin F. The unwoven fabric U, which is the fiber base material of the core member 30, is impregnated with the foamed resin F. For these reasons, the matrix resin MR, injected into the reinforcing fiber bodies 10*f* and 20*f*, is hard to permeate the core member 30. Thus, the production method P1 can form a clearer interface between the intermediate layer 3 and each of the two surface layers 1 and 2 in the molded article M. Hence, the production method P1 can stably secure a desired thickness for each of the layers 1, 2, 3 in the molded article M, and accordingly can enhance the reliability of the strength and rigidity of the molded article M.

<Another Method P2 of Producing Molded Article M>

Next, referring to FIGS. 3(*a*)-3(*d*), descriptions will be provided for another method P2 of producing the molded article M. It should be noted that members having the same functions as the foregoing members will be denoted by the same reference signs, and descriptions for such members will be omitted.

Figure 3A:
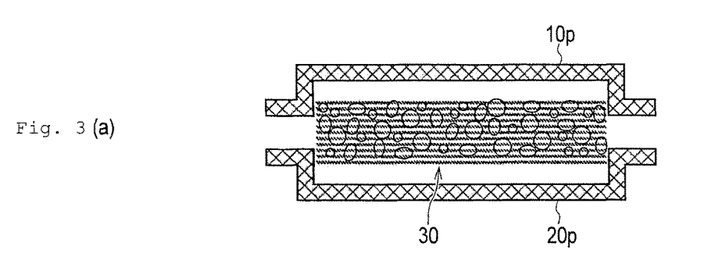
FIGS. 3(a)-3(d) are diagrams explaining another method of producing the composite material molded article shown in FIG. 1.
Figure 3B:
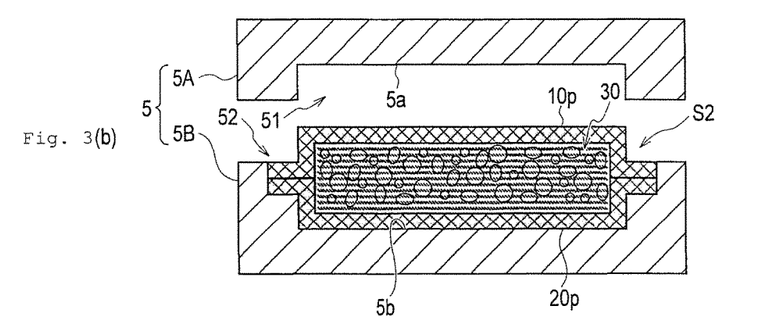
Figure 3C:
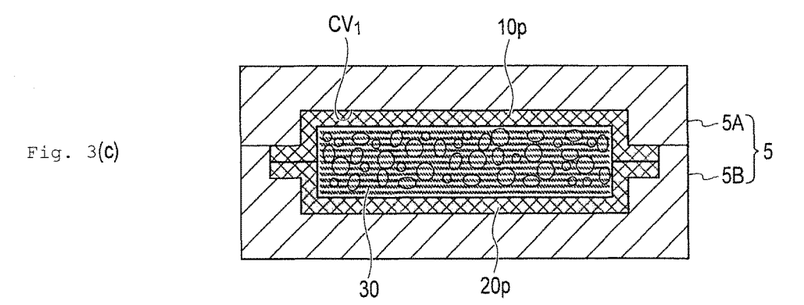
Figure 3D:
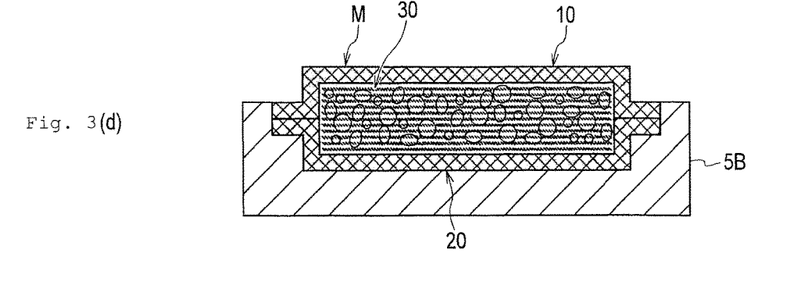

First, a first prepreg 10*p* is prepared by impregnating the first reinforcing fiber body 10*f* with the matrix resin and semi-curing the matrix resin, while a second prepreg 20*p* is prepared by impregnating the second reinforcing fiber body 20*f* with the matrix resin and semi-curing the matrix resin.

Furthermore, the core member 30 is prepared using one of the method C1 of preparing the core member 30 or the method C2 of preparing the core member 30, which will be described later.

Subsequently, a second laminated body S2 is formed: by placing the first prepreg 10*p* on the core member 30; and placing the second prepreg 20*p* under the core member 30, as shown in FIG. 3(*a*).

Thereafter, the second laminated body S2 is set in the molding tool 5, as shown in FIG. 3(*b*).

Subsequently, as shown in FIG. 3(*c*), the molding tool 5 is closed. After that, the upper mold 5A and the lower mold 5B press and heat the second laminated body S2 at the curing temperature of the matrix resin to cure the matrix resin in the prepregs 10*p* and 20*p*. Thereby, the prepregs 10*p* and 20*p* become the outer layer members 10 and 20, which are integrally-molded with the core member 30. Thereafter, the molding tool 5 is opened as shown in FIG. 3(*d*), and the integrally-molded outer layer members 10 and 20 and core member 30 are taken out of the molding tool 5 to obtain the molded article M.

As described above, using the molding tool 5, the production method P2 heats and molds the core member 30 placed between the prepregs 10*p* and 20*p*. Since the fiber base materials (the reinforcing fiber bodies 10*f* and 20*f*) of the prepregs 10*p* and 20*p* are impregnated with the matrix resin in advance, the production method P2 does not need to inject the matrix resin into the fiber base materials. For this reason, the injection of the matrix resin into the reinforcing fiber bodies 10*f* and 20*f*, which would be otherwise performed during the heating and molding, can be omitted from the production method P2. Moreover, the production method P2 can omit the resin injection inlet from the molding tool 5, and accordingly can make the structure of the molding tool 5 simpler.

Furthermore, since the production method P2 injects no molten resin into the molding tool 5, the production method P2 makes the matrix resin in the outer layer members 10 and 20 and the foamed resin F in the core member 30 less likely to mix with each other. To put it specifically, the production method P2 prevents the matrix resin in the outer layer members 10 and 20 from being mixed into the unwoven fabric U in the core member 30, and the foamed resin F in the core member 30 from being mixed into the reinforcing fiber bodies 10f and 20f of the outer layer members 10 and 20. Thus, the production method P2 can form a clearer interface between the intermediate layer 3 and each of the two surface layers 1 and 2 in the molded article M. Accordingly, the production method P2 can stably secure a desired thickness for each of the layers 1, 2, 3 in the molded article M, and accordingly can enhance the reliability of the strength and rigidity of the molded article M.

<Method C1 of Preparing Core Member 30>

Next, referring to FIGS. 4(a)-4(d), descriptions will be provided for a method C1 of preparing the core member 30. It should be noted that members having the same functions as the foregoing members will be denoted by the same reference signs, and descriptions for such members will be omitted.

Figure 4A:
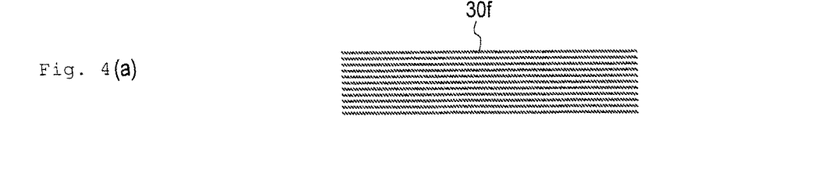
FIGS. 4(a)-4(d) are diagrams explaining a method of preparing a core member of the composite material molded article shown in FIG. 1.

First, as shown in FIG. 4(a), a core fiber body 30f, which is a fiber base material of the core member 30, is formed from the unwoven fabric U. The thickness of the core fiber body 30f is adjusted according to a required thickness of the core member 30. In a case where a relative large thickness is required for the core member 30, the core fiber body 30f may be formed by stacking multiple sheets of unwoven fabric U. The multiple sheets of unwoven fabric U may be integrated into a single piece by being bonded together using publicly-known bonding methods such as needle punching, thermal bonding, chemical bonding, stitch bonding, and spunlacing.

Figure 4B:
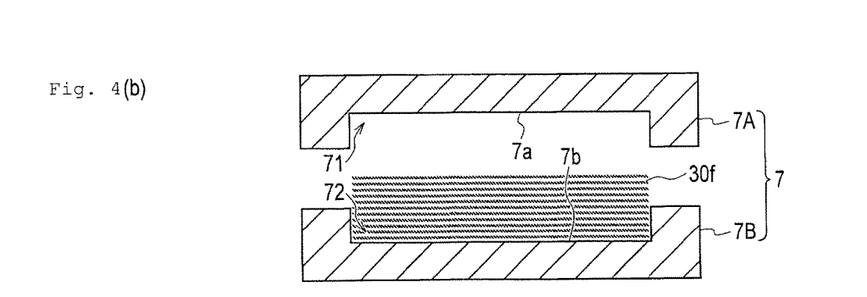

Thereafter, the core fiber body 30f is set in a mold 7, as shown in FIG. 4(b). The mold 7 includes an upper mold 7A and a lower mold 7B. A recessed portion 71, having a molding surface 7a, is formed in the upper mold 7A. A recessed portion 72, having a molding surface 7b, is formed in the lower mold 7B. When the mold 7 is closed, the recessed portion 71 and the recessed portion 72 are positioned opposite to each other so that the molding surface 7a and the molding surface 7b form a closed-mold cavity $CV_2$.

Figure 4C:
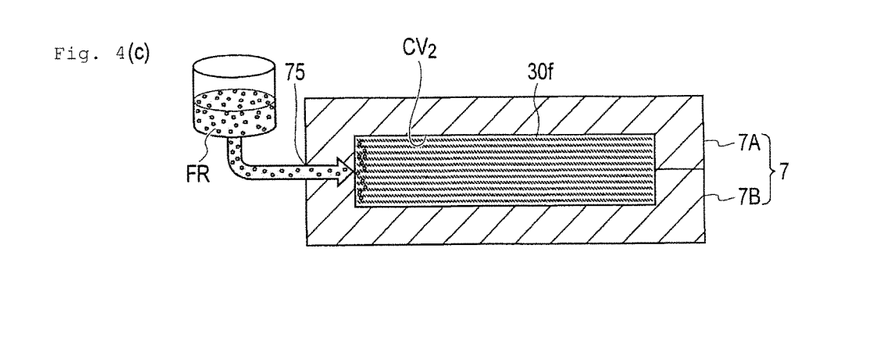

After that, as shown in FIG. 4(c), the core fiber body 30f is enclosed in the mold 7 by closing the mold 7. Then, molten resin (hereinafter referred to as "foamable resin FR") obtained by dissolving a foaming agent such as an inert gas in a synthetic resin such as polyurethane (PU), which is the material of the foamed resin F, is injected into the cavity $CV_2$ from a resin injection inlet 75 provided to the mold 7. The thus-injected foamable resin FR spreads across the cavity $CV_2$ while foamed, and reaches every part of the cavity $CV_2$ while entering interstices among the fibers of the unwoven fabric U of the core fiber body 30f. Incidentally, the fluid pressure, fluid temperature, injection rate, and so on for the injection can be determined according to recommended molding conditions for the foamable resin FR to be used, and can be adjusted as needed, depending on the dimensions and the like of the core member 30. For example, in a case where polyurethane is employed as the resin, the fluid pressure can be set at 7 to 20 MPa, and the fluid temperature can be set at 20 to 40° C.

Figure 4D:
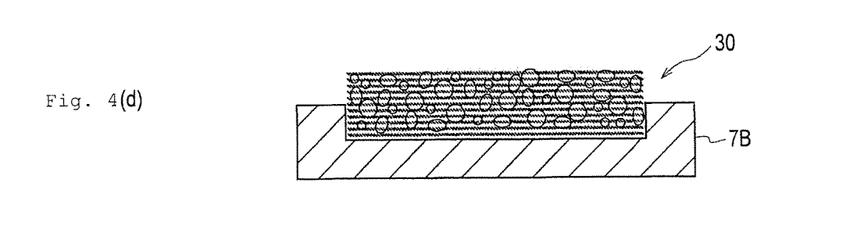

Until the injected foamable resin FR becomes solid inside the cavity $CV_2$ while foamed, the upper mold 7A and the lower mold 7B maintain the pressed state. Thereby, the core fiber body 30f, and the foamed resin F obtained by foaming and solidifying the foamable resin FR are integrally-molded. Thereafter, the mold 7 is opened as shown in FIG. 4(d), and the integrally-molded core fiber body 30f and foamed resin F are taken out of the mold 7 to obtain the core member 30.

As described above, the preparation method C1 injects the molten foamable resin FR into the core fiber body 30f enclosed in the mold 7. The injected foamable resin FR spreads across the core fiber body 30f while foamed. In other words, the foamable resin FR flows among the fibers of the core fiber body 30f while being thrusted by its own foaming pressure, and moves to every corner of the core fiber body 30f. Thus, the preparation method C1 can efficiently prepare the core member 30, whose core fiber body 30f is homogeneously-impregnated with the resin, from a smaller amount of resin.

<Method C2 of Preparing Core Member 30>

Next, referring to FIGS. 5(a)-5(d), descriptions will be provided for another method C2 of preparing the core member 30. It should be noted that members having the same functions as the foregoing members will be denoted by the same reference signs, and descriptions for such members will be omitted.

Figure 5A:
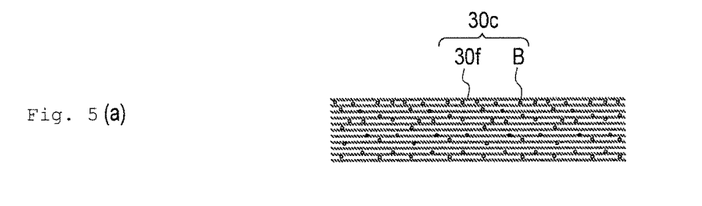
FIGS. 5(a)-5(d) are diagrams explaining another method of preparing the core member of the composite material molded article shown in FIG. 1.

First, as shown in FIG. 5(a), a core fiber body/beads mixture (hereinafter referred to as a "mixture 30c") is formed in which beads (foaming material) B are homogeneously-dispersed in the core fiber body 30f. The beads B are granular material obtained by blending a synthetic resin such as polystyrene (PS), polyethylene (PE), or polypropylene (PP), which is the material of the foamed resin F with a foaming agent, a foaming auxiliary agent, and the like. The beads B may, or do not have to be preliminarily foamed. The mixture 30c can be obtained by sprinkling the beads B on the unwoven fabric U used as the core fiber body 30f. The thickness of the mixture 30c can be adjusted according to a required thickness of the core member 30. For example, a relatively thick mixture 30c with the beads B homogeneously-dispersed therein can be formed: by stacking multiple sheets of unwoven fabric U sprinkled with the beads B; and repeatedly piercing them with needles to be used for the needle punching from above and from underneath.

Figure 5B:
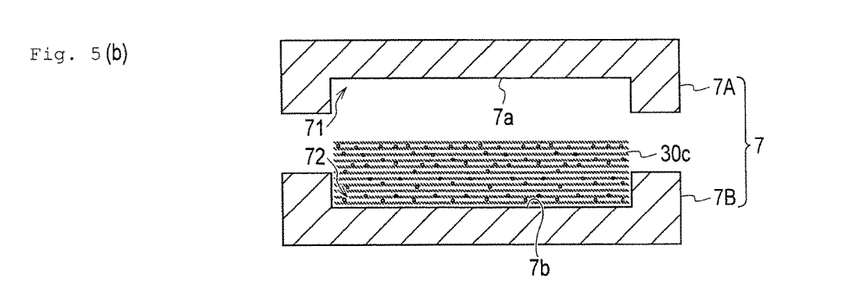

Subsequently, as shown in FIG. 5(b), the mixture 30c is set in the mold 7.

Figure 5C:
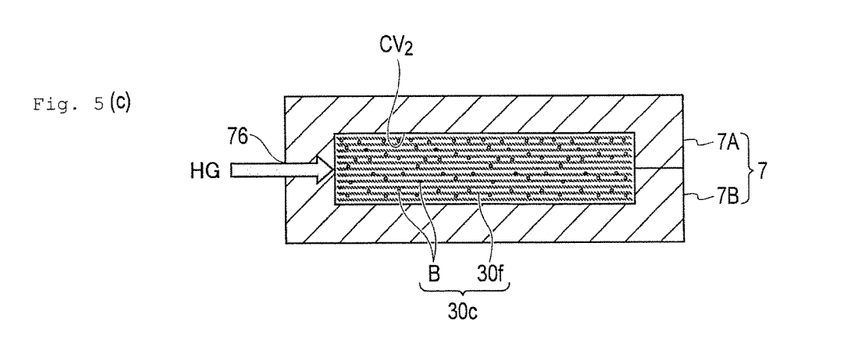

Thereafter, as shown in FIG. 5(c), the mixture 30c is enclosed in the mold 7 by closing the mold 7. After that, for example, a hot blast or steam with a temperature of 100 to 130° C. (hereinafter referred to as a "high-temperature gas HG") is injected into the cavity $CV_2$ from a gas injection inlet 76 provided to the mold 7. The high-temperature gas HG reaches every part of the cavity $CV_2$ while permeating the mixture 30c, and thereby heats the beads B in the mixture 30c. The heated beads B become molten or semi-molten to be foamed, expanded, and welded together. The resin of the beads B spreads across the cavity $CV_2$, while entering interstices among the fibers of the core fiber body 30f forming the mixture 30c. Incidentally, the temperature of the high-temperature gas HG can be set as needed depending on the material and the like of the beads B to be used.

Figure 5D:
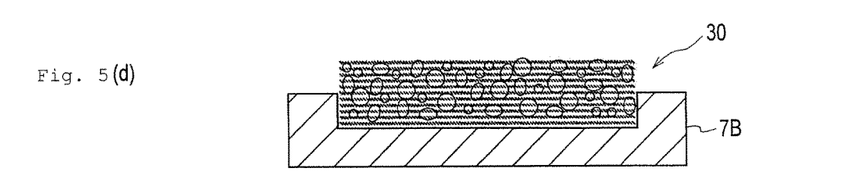

Until the beads B become solid inside the cavity $CV_2$ while foamed and expanded, the upper mold 7A and the lower mold 7B keep the mixture 30c pressed. Thereby, the core fiber body 30f forming the mixture 30c, and the foamed resin F obtained by foaming the beads B are integrally-molded. Thereafter, the mold 7 is opened as shown in FIG. 5(d), and the integrally-molded core fiber body 30f and foamed resin F are taken out of the mold 7 to obtain the core member 30.

As described above, the preparation method C2 encloses the mixture 30c formed by mixing the core fiber body 30f and the beads B in the mold 7; and foams the beads B by injecting the high-temperature gas HG thereinto. Like the preparation method C1, the preparation method C2 can impregnate the core fiber body 30f with the resin using the foaming pressure of the resin. Thus, the preparation method C2 can efficiently prepare the core member 30, whose core fiber body 30f is homogeneously-impregnated with the resin, from a smaller amount of resin.

Furthermore, since the beads B are homogeneously-dispersed in the mixture 30c, the preparation method C2 can obtain the more homogeneous core member 30. Moreover, the preparation method C2 can reduce the amount of movement of the resin relative to the core fiber body 30f during the foaming and molding, and accordingly, can easily maintain the placement and distribution of the fibers of the core fiber body 30f before and after the foaming and molding.

<Another Method P3 of Producing Molded Article M>

Next, referring to FIGS. 6(a)-6(d), descriptions will be provided for another method P3 of producing the molded article M. It should be noted that members having the same functions as the foregoing members will be denoted by the same reference signs, and descriptions for such members will be omitted.

Figure 6A:
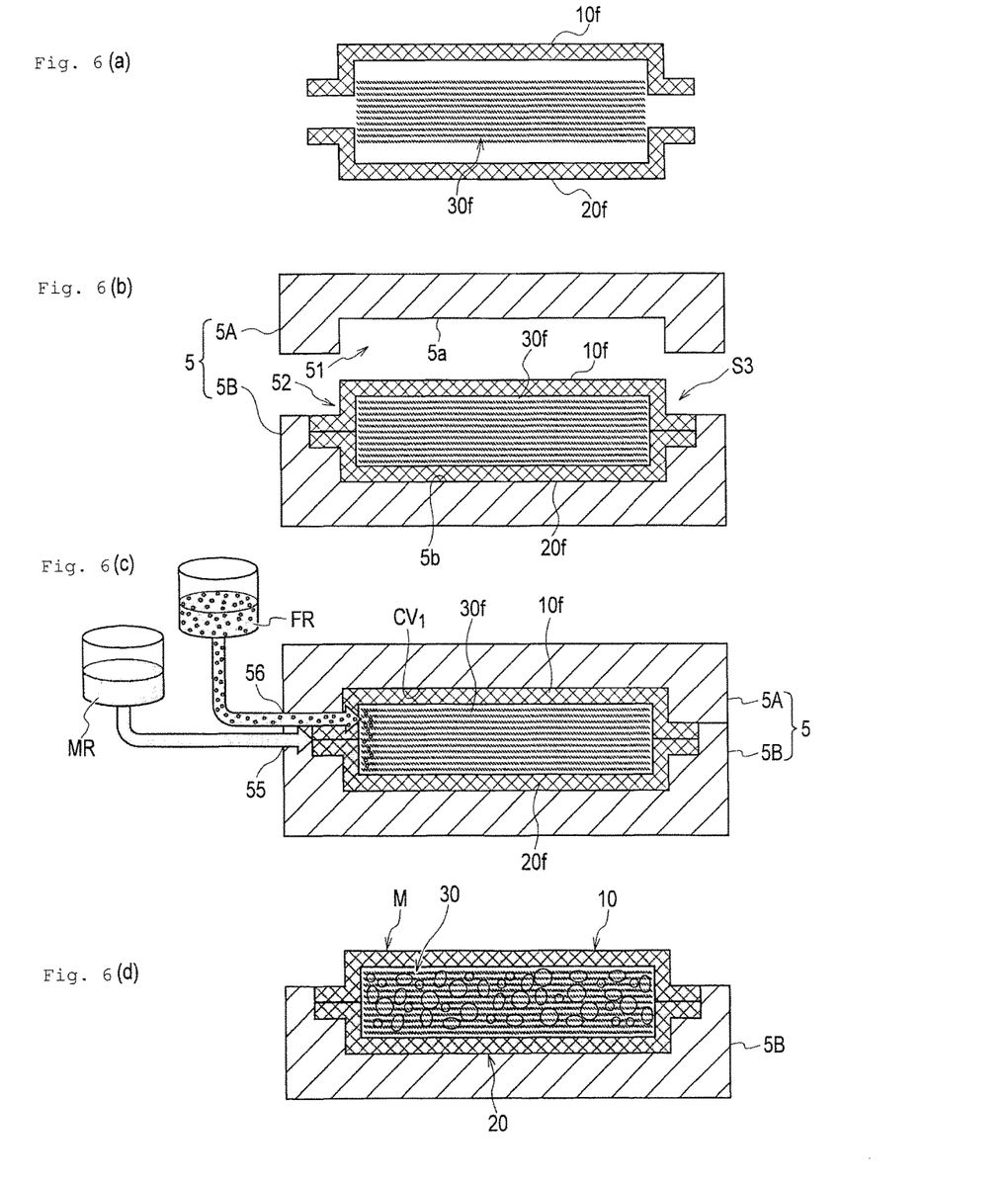

First, as shown in FIG. 6(a), a third laminated body S3 is formed: by placing the reinforcing fiber body 10f on the core fiber body 30f; and placing the reinforcing fiber body 20f under the core fiber body 30f, as shown in FIG. 6(a).

Thereafter, the third laminated body S3 is set in the molding tool 5, as shown in FIG. 6(b).

Subsequently, as shown in FIG. 6(c), the third laminated body S3 is enclosed in the molding tool 5 by closing the molding tool 5. The molten matrix resin MR is injected from the matrix resin injection inlet 55 provided to the molding tool 5, while the molten foamable resin FR, in which the inert gas or the like is dissolved, is injected from a foamable resin injection inlet 56 provided to the molding tool 5.

The matrix resin MR is injected into the reinforcing fiber bodies 10f and 20f in the cavity $CV_1$. The thus-injected matrix resin MR spreads across the gaps formed around the core fiber body 30f between the outer peripheral surfaces of the core fiber body 30f and the molding surfaces 5a and 5b. Thereby, the matrix resin MR reaches every part of the two reinforcing fiber bodies 10f and 20f while entering interstices among the reinforcing fibers forming the reinforcing fiber bodies 10f and 20f.

The foamable resin FR is injected into the core fiber body 30f in the cavity $CV_1$. The injected foamable resin FR spreads across the core fiber body 30f while foamed, and reaches every part of the core fiber body 30f while entering interstices among the fibers of the unwoven fabric U forming the core fiber body 30f.

The production method P3 starts to inject the foamable resin FR into the core fiber body 30f after starting to inject the matrix resin MR into the reinforcing fiber bodies 10f and 20f. For this reason, before the foamable resin FR spreading across the core fiber body 30f reaches the interfaces between the core fiber body 30f and the reinforcing fiber bodies 10f and 20f, the reinforcing fiber bodies 10f and 20f situated on the outer sides of the interfaces are already impregnated with the matrix resin MR. Thereby, the foamable resin FR, injected into the core fiber body 30f, is inhibited from permeating the reinforcing fiber bodies 10f and 20f. Incidentally, the fluid pressures, fluid temperatures, injection rates, and so on for the injection of the matrix resin MR and the foamable resin FR can be determined according to the recommended molding conditions for the resins. A time lag between when the injection of the matrix resin MR is started and when the injection of the foamable resin FR is started can be set as needed, with consideration given to the dimensions of the outer layer members 10 and 20, the dimensions of the core member 30, the speed of movement of the foamable resin FR inside the core fiber body 30f, the speed of movement of the matrix resin MR inside the reinforcing fiber bodies 10f and 20f, and the like.

After that, the upper mold 5A and the lower mold 5B press and heat the third laminated body S3 at the curing temperature of the matrix resin MR, to cure the matrix resin MR injected into the reinforcing fiber bodies 10f and 20f, and to foam and solidify the foamable resin FR injected into the core fiber body 30f. Thereby, after the matrix resin MR is cured, the reinforcing fiber bodies 10f and 20f become the outer layer members 10 and 20. In addition, after the foaming and solidifying of the foamable resin FR is completed, the core fiber body 30f becomes the core member 30, which is integrally-molded with both outer layer members 10 and 20. Thereafter, the molding tool 5 is opened as shown in FIG. 6(d), and the integrally-molded outer layer members 10 and 20 and core member 30 are taken out of the molding tool 5 to obtain the molded article M.

As described above, like the production method P1, the production method P3 injects the molten matrix resin MR into the reinforcing fiber bodies 10f and 20f in the molding tool 5. Thus, the production method P3 can accurately form the matrix resin MR into intended shapes using the molding surfaces 5a and 5b of the molding tool 5, and accordingly can efficiently produce the molded article M having complicated surface shapes. Furthermore, because of the foaming pressure of the foamable resin FR, the production method P3 can apply a more uniform pressure to the reinforcing fiber bodies 10f and 20f and the matrix resin MR to become the outer layer members 10 and 20. Thus, the production method P3 can make the surfaces of the outer layer members 10 and 20 smoother, and accordingly can enhance the quality of the external appearance of the molded article M.

Moreover, the production method P3 encloses the core fiber body 30f in the molding tool 5 with the core fiber body 30f placed between the reinforcing fiber bodies 10f and 20f. Thereafter, the production method P3 injects the molten matrix resin MR into the reinforcing fiber bodies 10f and 20f in the molding tool 5, and injects the molten foamable resin FR into the core fiber body 30f in the molding tool 5. Thus, the production method P3 can form the outer layer members 10 and 20 and the core member 30 using the single molding tool 5 in a single step, and accordingly can minimize production costs of the molded article M.

The production method P3 starts to inject the foamable resin FR into the core fiber body 30f after starting to inject the matrix resin MR into the reinforcing fiber bodies 10f and 20f. Thus, before the foamable resin FR, spreading across the core fiber body 30f, reaches the interfaces between the core fiber body 30f and the reinforcing fiber bodies 10f and 20f, the production method P3 can impregnate the reinforcing fiber bodies 10f and 20f situated on the outer sides of the interfaces with the matrix resin MR. The injected foamable resin FR is hard to permeate the reinforcing fiber bodies 10f and 20f that are already impregnated with the matrix resin MR. Hence, the production method P3 can form a clearer interface between the intermediate layer 3 and each of the two surface layers 1 and 2 in the molded article M. Accordingly, the production method P3 can stably secure a desired thickness for each of the layers 1, 2, and 3 in the molded article M, and accordingly can enhance the reliability of the strength and rigidity of the molded article M.

<Another Method P4 of Producing Molded Article M>

Next, referring to FIGS. 7(a)-7(d), descriptions will be provided for another method P4 of producing the molded article M. It should be noted that members having the same functions as the foregoing members will be denoted by the same reference signs, and descriptions for such members will be omitted.

Figure 7A:
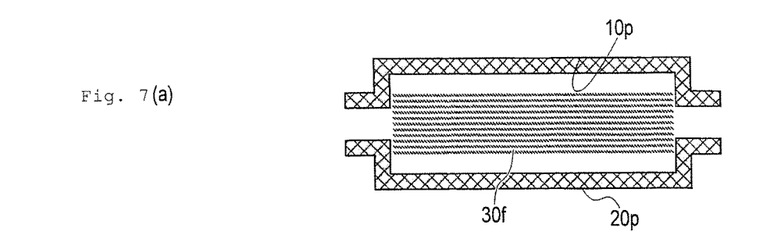
FIGS. 7(a)-7(d) are diagrams explaining another method of producing the composite material molded article shown in FIG. 1.

First, a fourth laminated body S4 is formed: by placing the first prepreg 10p on the core fiber body 30f; and placing the second prepreg 20p under the core fiber body 30f, as shown in FIG. 7(a).

Figure 7B:
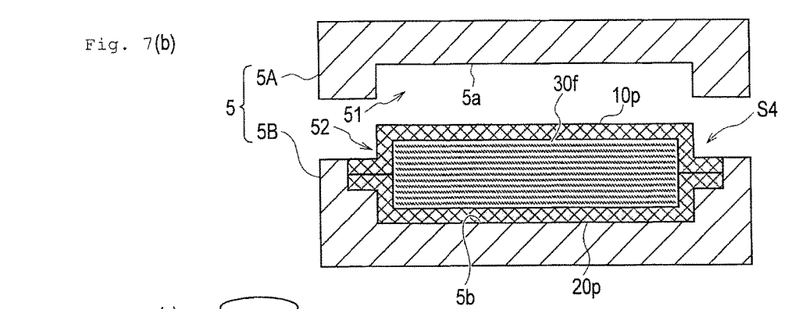

Thereafter, the fourth laminated body S4 is set in the molding tool 5, as shown in FIG. 7(b).

Figure 7C:
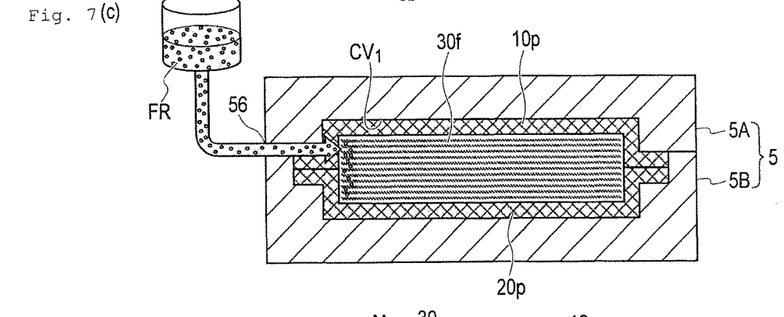

Next, as shown in FIG. 7(c), the fourth laminated body S4 is enclosed in the molding tool 5 by closing the molding tool 5. Subsequently, the molten foamable resin FR, in which the inert gas or the like is dissolved, is injected into the core fiber body 30f in the cavity $CV_1$ from the foamable resin injection inlet 56, provided to the molding tool 5. The thus-injected foamable resin FR spreads across the core fiber body 30f while foamed, and reaches every part of the core fiber body 30f while entering interstices among the fibers of the unwoven fabric U, forming the core fiber body 30f. Incidentally, the fluid pressure, fluid temperature, injection rate, and so on for the injection of the foamable resin FR can be determined according to the recommended molding conditions for the foamable resin FR to be used, and can be adjusted as needed depending on the dimensions and the like of the core member 30.

Figure 7D:
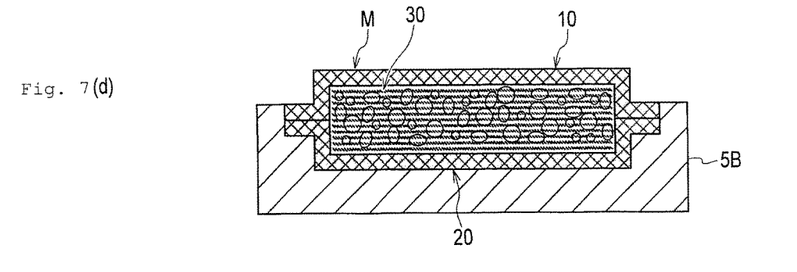

After that, the upper mold 5A and the lower mold 5B presses and heats the fourth laminated body S4 at the curing temperature of the matrix resin, to cure the matrix resin in the prepregs 10p and 20p, and to foam and solidify the foamable resin FR injected into the core fiber body 30f. Thereby, after the matrix resin is cured, the prepregs 10p and 20p become the outer layer members 10 and 20. In addition, after the foaming and solidifying of the foamable resin FR is completed, the core fiber body 30f becomes the core member 30, which is integrally-molded with the outer layer members 10 and 20. Thereafter, the molding tool 5 is opened as shown in FIG. 7(d), and the integrally-molded outer layer members 10 and 20 and core member 30 are taken out of the molding tool 5 to obtain the molded article M.

As described above, the production method P4 encloses the core fiber body 30f in the molding tool 5 with the core fiber body 30f placed between the prepregs 10p and 20p, and injects the molten foamable resin FR into the core fiber body 30f in the molding tool 5. Since the reinforcing fiber bodies 10f and 20f, which are the fiber base materials of the prepregs 10p and 20p, are impregnated with the matrix resin in advance, the foamable resin FR injected into the core fiber body 30f is hard to permeate the reinforcing fiber bodies 10f and 20f in the prepregs 10p and 20p. Thus, the production method P4 can form a clearer interface between the intermediate layer 3 and each of the two surface layers 1 and 2 in the molded article M. Accordingly, the production method P4 can stably secure a desired thickness for each of the layers 1, 2, and 3 in the molded article M, and accordingly can enhance the reliability of the strength and rigidity of the molded article M.

Furthermore, because of the foaming pressure of the foamable resin FR, the production method P4 can apply a more uniform pressure to the prepregs 10p and 20p to become the outer layer members 10 and 20. Thus, the production method P4 can make the surfaces of the outer layer members 10 and 20 smoother, and accordingly can enhance the quality of the external appearance of the molded article M. Moreover, the production method P4 can form the outer layer members 10 and 20 and the core member 30 using the single molding tool 5 in the single step, and accordingly can minimize the production costs of the molded article M. Meanwhile, although needing to inject the foamable resin FR into the core fiber body 30f, the production method P4 does not need to inject the matrix resin into the molding tool 5. Thus, the number of resin injection inlets to be provided to the molding tool 5 can be made smaller in the production method P4 than in the production method P3. Accordingly, the production method P4 can make the structure of the molding tool 5 simpler.

The foregoing production methods P3 and P4 produce the core member 30 by injecting the foamable resin FR into the core fiber body 30f, like the foregoing method C1 of preparing the core member 30. Thus, the production methods P3 and P4 can obtain the same effects as the preparation method C1.

<Another Method P5 of Producing Molded Article M>

Next, referring to FIGS. 8(a)-8(d), descriptions will be provided for another method P5 of producing the molded article M. It should be noted that members having the same functions as the foregoing members will be denoted by the same reference signs, and descriptions for such members will be omitted.

Figure 8A:
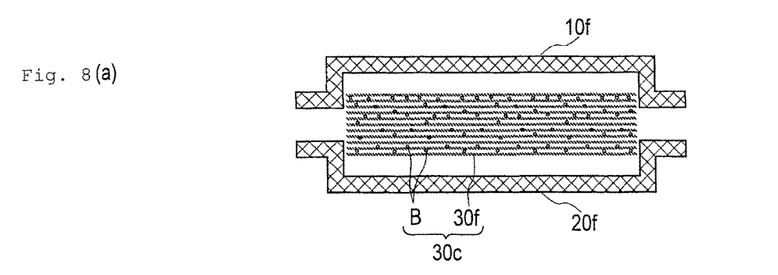
FIGS. 8(a)-8(d) are diagrams explaining another method of producing the composite material molded article shown in FIG. 1.

First, a fifth laminated body S5 is formed: by placing the first reinforcing fiber body 10f on the mixture 30c; and placing the second reinforcing fiber body 20f under the mixture 30c, as shown in FIG. 8(a).

Figure 8B:
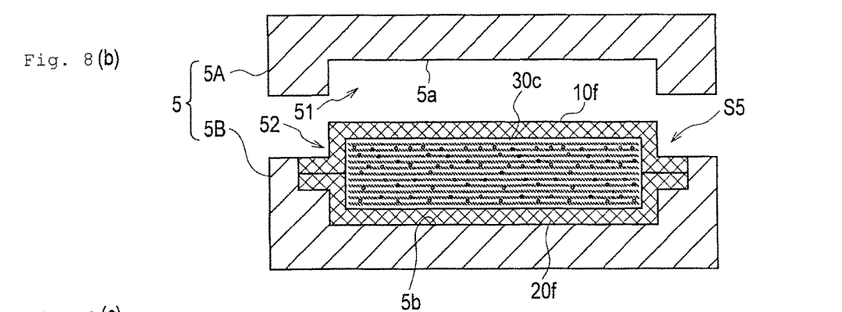

Thereafter, the fifth laminated body S5 is set in the molding tool 5, as shown in FIG. 8(b).

Figure 8C:
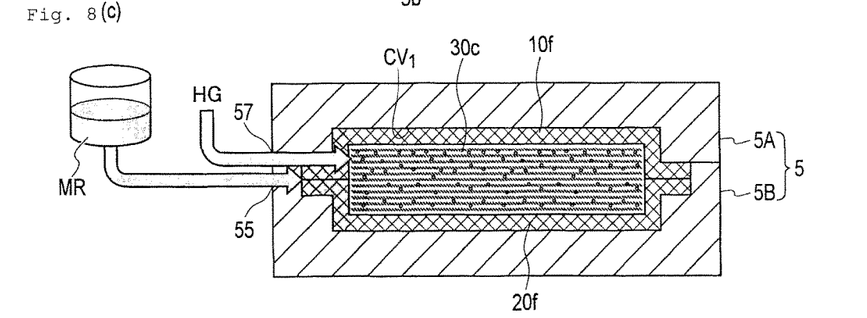

Next, as shown in FIG. 8(c), the fifth laminated body S5 is enclosed in the molding tool 5 by closing the molding tool 5. After that, the molten matrix resin MR is injected from the matrix resin injection inlet 55 provided to the molding tool 5, and the high-temperature gas HG, for example, with a temperature of 100 to 130° C., is injected from a gas injection inlet 57 provided to the molding tool 5.

The matrix resin MR is injected into the reinforcing fiber bodies 10f and 20f in the cavity $CV_1$. The injected matrix resin MR spreads across spaces formed around the mixture 30c between the outer peripheral surfaces of the mixture 30c and the molding surfaces 5a and 5b. Thereby, the matrix resin MR reaches every part of the two reinforcing fiber bodies 10f and 20f while entering interstices among the reinforcing fibers forming the reinforcing fiber bodies 10f and 20f.

The high-temperature gas HG is injected into the mixture 30c in the cavity $CV_1$. The injected high-temperature gas HG reaches every part of the mixture 30c while permeating the mixture 30c, and thereby heats the beads B in the mixture 30c. The heated beads B become molten or semi-molten to be foamed, expanded, and welded together. The resin of the beads B spread across the core fiber body 30f, forming the mixture 30c, while entering interstices among the fibers of the core fiber body 30f. Incidentally, the temperature of the high-temperature gas HG can be set as needed, depending on the material and the like of the beads B to be used.

The production method P5 starts to inject the high-temperature gas HG into the mixture 30c before starting to inject the matrix resin MR into the reinforcing fiber bodies 10f and 20f. For this reason, after sufficiently foaming and expanding the beads B in the mixture 30c to impregnate the core fiber body 30f of the mixture 30c with the resin, the production method P5 can make the matrix resin MR flow into the spaces around the mixture 30c. Thereby, the production method P5 inhibits the matrix resin MR from permeating the mixture 30c. Incidentally, the fluid pressure, fluid temperature, and injection rate for the injection of the matrix resin MR, the temperature of the high-temperature gas HG, and the like can be determined according to the recommended molding conditions for the matrix resin MR to be used, and can be adjusted as needed, depending on the dimensions of the outer layer members 10, 20, and the like.

Figure 8D:
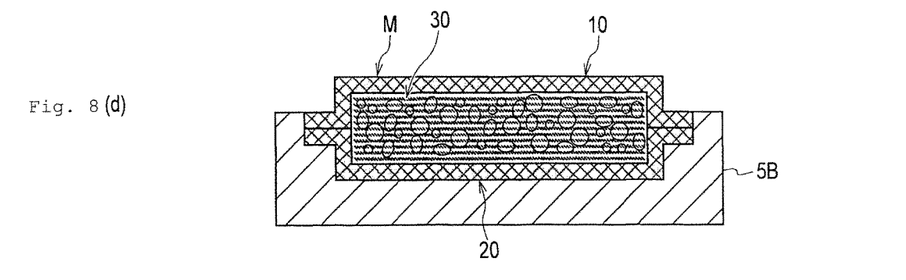

After that, the upper mold 5A and the lower mold 5B press and heat the fifth laminated body S5 at the curing temperature of the matrix resin MR to cure the matrix resin MR injected into the reinforcing fiber bodies 10f and 20f, and to foam and solidify the beads B. Thereby, after the matrix resin MR is cured, the reinforcing fiber bodies 10f and 20f become the outer layer members 10 and 20. In addition, after the foaming and solidifying of the beads B is completed, the mixture 30c becomes the core member 30, which is integrally-molded with the outer layer members 10 and 20. Thereafter, the molding tool 5 is opened as shown in FIG. 8(d), and the integrally-molded outer layer members 10 and 20 and core member 30 are taken out of the molding tool 5 to obtain the molded article M.

As described above, like the production method P1, the production method P5 injects the molten matrix resin MR into the reinforcing fiber bodies 10f and 20f in the molding tool 5. Thus, the production method P5 can accurately form the matrix resin MR into intended shapes using the molding surfaces 5a and 5b of the molding tool 5, and accordingly can efficiently produce the molded article M having complicated surface shapes.

Furthermore, because of the foaming pressure of the beads B, the production method P5 can apply a more uniform pressure to the matrix resin MR and the reinforcing fiber bodies 10f and 20f to become the outer layer members 10 and 20. Thus, the production method P5 can make the surfaces of the outer layer members 10 and 20 smoother, and accordingly can enhance the quality of the external appearance of the molded article M. Moreover, the production method P5 encloses the mixture 30c in the molding tool 5 with the mixture 30c placed between the reinforcing fiber body 10f and the reinforcing fiber body 20f. Thereafter, the production method P5 injects the molten matrix resin MR into the reinforcing fiber bodies 10f and 20f in the molding tool 5, and injects the high-temperature gas HG into the mixture 30c in the molding tool 5. Thus, the production method PS can form the outer layer members 10 and 20 and the core member 30 using the single molding tool 5 in the single step, and accordingly can minimize production costs of the molded article M.

The production method P5 starts to inject the high-temperature gas HG into the mixture 30c before starting to inject the matrix resin MR into the reinforcing fiber bodies 10f and 20f. Thus, after sufficiently foaming and expanding the beads B in the mixture 30c to impregnate the core fiber body 30f of the mixture 30c with the resin, the production method P5 can make the matrix resin MR flow into the reinforcing fiber bodies 10f and 20f in the spaces around the mixture 30c. The injected matrix resin MR is hard to permeate the core fiber body 30f already impregnated with the resin of the beads B. Hence, the production method P5 can form a clearer interface between the intermediate layer 3 and each of the two surface layers 1 and 2 in the molded article M. Accordingly, the production method P5 can stably secure a desired thickness for each of the layers 1, 2, and 3 in the molded article M, and accordingly can enhance the reliability of the strength and rigidity of the molded article M.

<Another Method P6 of Producing Molded Article M>

Next, referring to FIGS. 9(a)-9(d), descriptions will be provided for another method P6 of producing the molded article M. It should be noted that members having the same functions as the foregoing members will be denoted by the same reference signs, and descriptions for such members will be omitted.

Figure 9A:
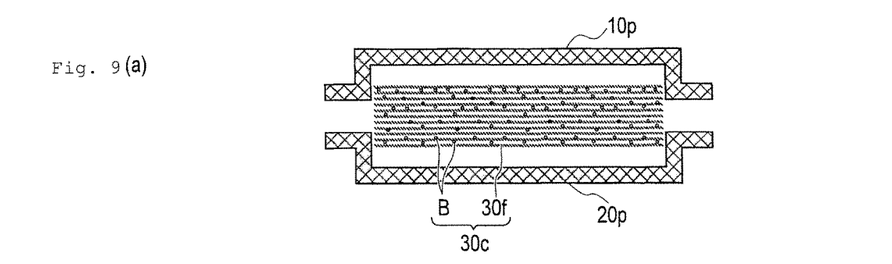
FIGS. 9(a)-9(d) are diagrams explaining another method of producing the composite material molded article shown in FIG. 1.

First, a sixth laminated body S6 is formed: by placing the first prepreg 10p on the mixture 30c; and placing the second prepreg 20p under the mixture 30c, as shown in FIG. 9(a).

Figure 9B:
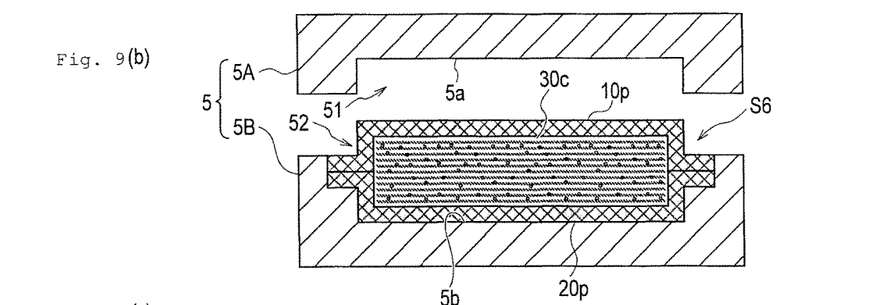

Thereafter, the sixth laminated body S6 is set in the molding tool 5, as shown in FIG. 9(b).

Figure 9C:
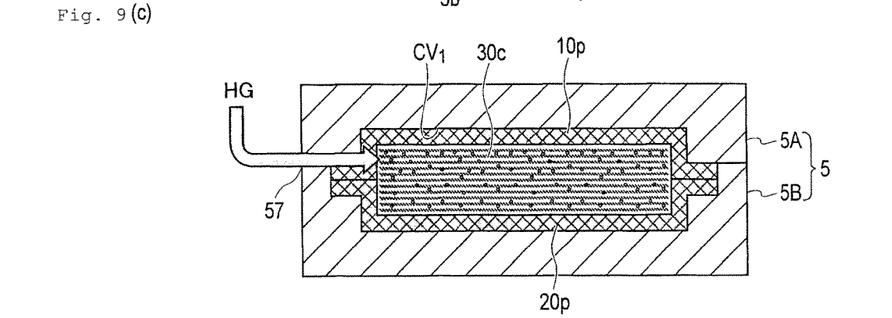

Next, as shown in FIG. 9(c), the sixth laminated body S6 is enclosed in the molding tool 5 by closing the molding tool 5. After that, the high-temperature gas HG, for example, with a temperature of 100 to 130° C., is injected from the gas injection inlet 57 provided to the molding tool 5.

The high-temperature gas HG is injected into the mixture 30c in the cavity $CV_1$. The injected high-temperature gas HG reaches every part of the mixture 30c while permeating the mixture 30c, and thereby heats the beads B in the mixture 30c. The heated beads B become molten or semi-molten to be foamed, expanded, and welded together. The resin of the beads B spread across the core fiber body 30f forming the mixture 30c, while entering interstices among the fibers of the core fiber body 30f. Incidentally, the temperature of the high-temperature gas HG can be set as needed, depending on the material and the like of the beads B to be used.

Figure 9D:
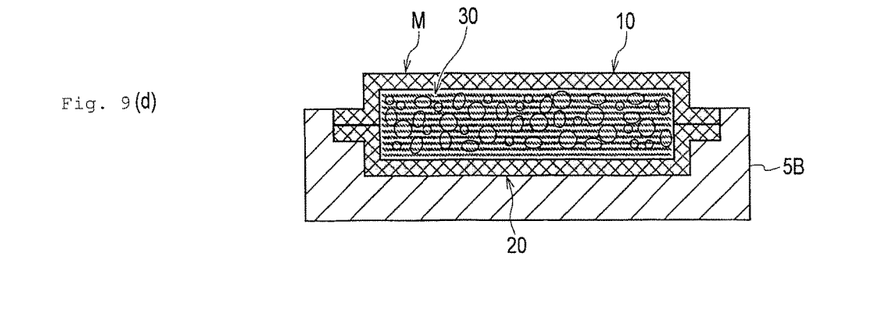

After that, the upper mold 5A and the lower mold 5B press and heat the sixth laminated body S6 at the curing temperature of the matrix resin to cure the matrix resin in the prepregs 10p and 20p, and to foam and solidify the beads B in the mixture 30c. Thereby, after the matrix resin is cured, the prepregs 10p and 20p become the outer layer members 10 and 20. In addition, after the foaming and solidifying of the beads B is completed, the mixture 30c becomes the core member 30, which is integrally-molded with the outer layer members 10 and 20. Thereafter, the molding tool 5 is opened as shown in FIG. 9(d), and the integrally-molded outer layer members 10 and 20 and core member 30 are taken out of the molding tool 5 to obtain the molded article M.

As described above, the production method P6 encloses the mixture 30c in the molding tool 5 with the mixture 30c placed between the prepregs 10p and 20p, and injects the high-temperature gas HG into the mixture 30c in the molding tool 5. Since the reinforcing fiber bodies 10f and 20f, which are the fiber base materials of the prepregs 10p and 20p, are impregnated with the matrix resin in advance, the resin of the beads B to be foamed in the mixture 30c is hard to permeate the reinforcing fiber bodies 10f and 20f in the prepregs 10p and 20p. Thus, the production method P6 can form a clearer interface between the intermediate layer 3 and each of the two surface layers 1 and 2 in the molded article M. Accordingly, the production method P6 can stably secure a desired thickness for each of the layers 1, 2, and 3 in the molded article M, and accordingly can enhance the reliability of the strength and rigidity of the molded article M.

Furthermore, because of the foaming pressure of the beads B, the production method P6 can apply a more uniform pressure to the prepregs 10p and 20p to become the outer layer members 10 and 20. Thus, the production method P6 can make the surfaces of the outer layer members 10 and 20 smoother, and accordingly can enhance the quality of the external appearance of the molded article M. Moreover, the production method P6 can form the outer layer members 10 and 20 and the core member 30 using the single molding tool 5 in the single step, and accordingly can minimize the production costs of the molded article M. Meanwhile, although needing to inject the high-temperature gas HG into the mixture 30c, the production method P6 does not need to inject the matrix resin into the molding tool 5. Thus, the production method P6 makes the resin injection inlet unnecessary to be provided to the molding tool 5, and accordingly makes the structure of the molding tool 5 simpler.

The foregoing production methods P5 and P6 produce the core member 30 by foaming and expanding the beads B sprinkled on the mixture 30c, like the production method C2 of producing the core member 30. Thus, the production methods P5 and P6 can obtain the same effects as the production method C2.

Although the foregoing descriptions have been provided for the embodiments of the present invention, these embodiments are shown just as examples described for the purpose of facilitating the understanding of the present invention, and the present invention is not limited to the embodiments. The technical scope of the present invention is not limited to the specific technical matters disclosed by the embodiments, and includes various modifications, changes, and alternative techniques which will be easily derived from the disclosed technical matter.

Although one or more of the foregoing embodiments form the intermediate layer 3 from the core member 30 only, another layer member may be placed between the core member 30 and the first outer layer member 10, or between the core member 30 and the second outer layer member 20. For example, an adhesive layer formed from a hot-melt adhesive or the like may be placed between the core member 30 and the outer layer member 10 or 20, in order to increase the adhesion between the core member 30 and the outer layer member. Otherwise, another layer may be provided to the outer sides of the respective surface layers 1 and 2. For example, a decorative surface member or the like may be provided to the outer surfaces of the respective outer layer members 10 and 20.

Furthermore, where and how many matrix resin injection inlets 55, foamable resin injection inlets 56 and 75, and gas injection inlets 57 and 76 are set are not limited to what has been illustrated. It is a matter of course that multiple matrix resin injection inlets 55, foamable resin injection inlets 56 and 75, and gas injection inlets 57 and 76 may be set at appropriate places, depending on the dimensions of the outer layer members 10 and 20, the dimensions of the core member 30, and the resin materials to be used in them.

One or more embodiments of the present invention is applicable to composite material molded articles whose intermediate layers include unwoven fabric.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

M composite material molded article
1 first surface layer (first layer)
2 second surface layer (second layer)
3 intermediate layer
10 first outer layer member (first fiber-reinforced resin)
10f first reinforcing fiber body (first reinforcing fiber base material)
10p first prepreg (first fiber-reinforced resin material)
20 second outer layer member (second fiber-reinforced resin)
20f second reinforcing fiber body (second reinforcing fiber base material)
20p second prepreg (second fiber-reinforced resin material)
30 core member (composite molded body of a composite of unwoven fabric and foamed resin)
30f core fiber body (core fiber base material)
30c core fiber body/beads mixture (mixture)
U unwoven fabric
F foamed resin
B beads (foaming material)
MR matrix resin
FR foamable resin
HG hot blast or steam (high-temperature gas)
5 molding tool
7 mold

The invention claimed is:

1. A method of producing a composite material molded article, comprising:
enclosing a core fiber base material formed from unwoven fabric in a molding tool with the core fiber base material placed between a first reinforcing fiber base material and a second reinforcing fiber base material;
injecting matrix resin into the first and second reinforcing fiber base materials in the molding tool; and
injecting foamable resin into the core fiber base material in the molding tool,
wherein the injecting foamable resin starts after the injecting matrix resin starts.

* * * * *